United States Patent [19]

Holmes et al.

[11] 4,147,842

[45] Apr. 3, 1979

[54] LITHIUM-BROMINE CELL

[75] Inventors: Curtis F. Holmes; Max A. Mueller, both of E. Amherst, N.Y.

[73] Assignee: Eleanor & Wilson Greatbatch Foundation, Akron, N.Y.

[21] Appl. No.: 915,518

[22] Filed: Jun. 14, 1978

[51] Int. Cl.² ............................................. H01M 6/24
[52] U.S. Cl. .................................. 429/101; 429/191; 429/199; 429/218
[58] Field of Search ............... 429/101, 104, 191, 199, 429/218

[56] References Cited

U.S. PATENT DOCUMENTS

| 3,660,163 | 5/1972 | Moser | 429/191 |
|---|---|---|---|
| 3,793,080 | 2/1974 | Hess | 429/104 |
| 3,957,533 | 5/1976 | Mead et al. | 429/218 X |
| 3,994,747 | 11/1976 | Greatbatch et al. | 429/199 |
| 4,072,803 | 2/1978 | Schneider | 429/191 X |
| 4,105,838 | 8/1978 | Greatbach et al. | 429/104 |

*Primary Examiner*—Charles F. Lefevour
*Attorney, Agent, or Firm*—Christel & Bean

[57] ABSTRACT

A lithium-bromine cell comprising a lithium anode, a solid electrolyte comprising lithium bromide and a cathode comprising a charge transfer complex of a monomer and bromine, in particular pyridinium bromide per bromide. Liquid bromine can be added to the solid pyridinium bromide per bromide in the cathode.

6 Claims, 5 Drawing Figures

LITHIUM-BROMINE CELL

BACKGROUND OF THE INVENTION

This invention relates to the conversion of chemical energy to electrical energy, and more particularly to a new and improved lithium-bromine cell.

A lithium-bromine cell has been developed and patented which includes a lithium anode, a solid lithium bromide electrolyte and a bromine cathode. This cell utilizes the desirable characteristics of bromine, among which are a significant degree of chemical activity, a moderately low molecular weight, and a significant level of energy density. In the further development of lithium-bromine cells, one area of investigation is the nature of the cathode. Among the factors to be considered in connection with such investigation are current capability, energy density and temperature compatibility.

SUMMARY OF THE INVENTION

It is, therefore, an object of this invention to provide a new and improved lithium-bromine cell.

It is a further object of this invention to provide such a lithium-bromine cell having increased energy density.

It is a further object of this invention to provide such a lithium-bromine cell capable of delivering relatively higher current.

It is a further object of this invention to provide such a lithium-bromine cell capable of operation under relatively low temperature conditions.

The present invention provides a lithium-bromine cell comprising a lithium anode, a solid electrolyte comprising lithium bromide and a cathode comprising a charge transfer complex of a monomer and bromine. In particular, the cathode comprises pyridinium bromide per bromide. The cathode can comprise a mixture of solid pyridinium bromide per bromide and liquid bromine. In addition, the operative surface of the lithium anode can be coated with an organic electron donor material such as polyvinyl pyridine.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
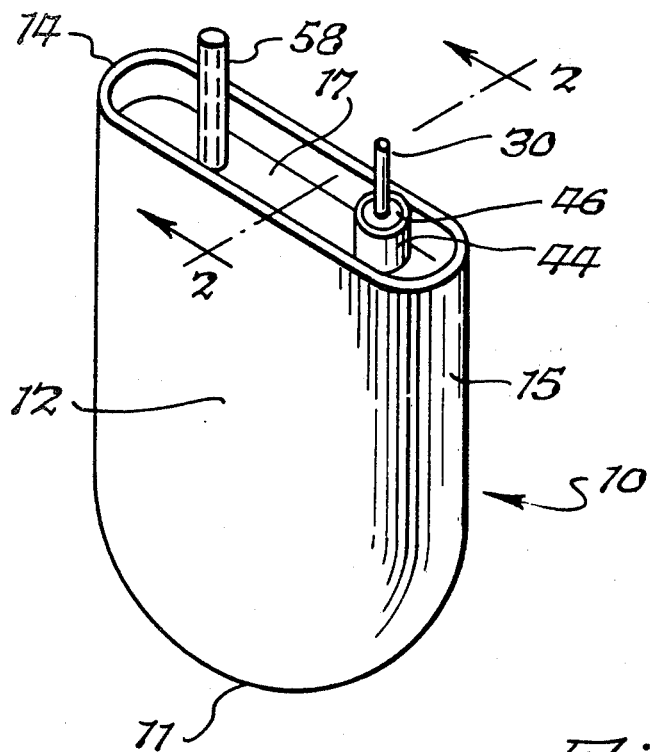
FIG. 1 is a perspective view of a lithium-bromine cell according to the present invention.

Referring now to FIG. 1, a lithium-bromine cell according to the present invention comprises a casing 10 of metal such as stainless steel which preferably is shaped or otherwise formed to be hollow and generally rectangular in shape of an integral construction including a curved bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound curvature in that it is curved both in a direction between the side wall portions 12, 13 and also is curved in a direction between the end wall portions 14, 15. This latter curvature of bottom portion 11 is of the same degree as the curvature of the end wall portions 14, 15 thereby defining a continuous, curved surface around along the casing. The side wall portions 12, 13 are generally parallel. The casing has an opened top or end opposite the bottom portion 11 which is sealed closed by means of a lid 17 also of metal such as stainless steel.

Figure 2:
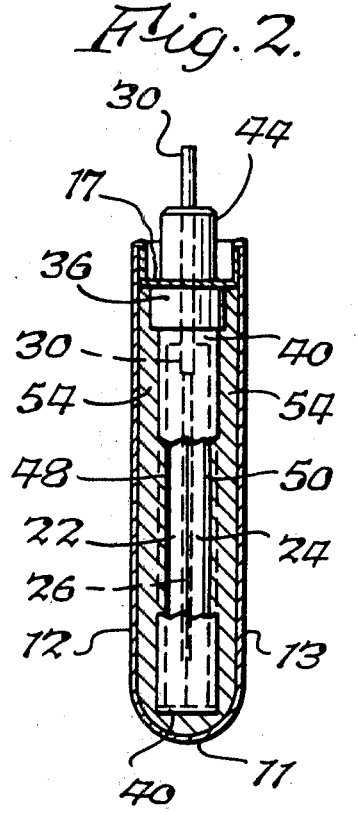
FIG. 2 is a sectional view taken about on line 2—2 in FIG. 1.
Figure 3:
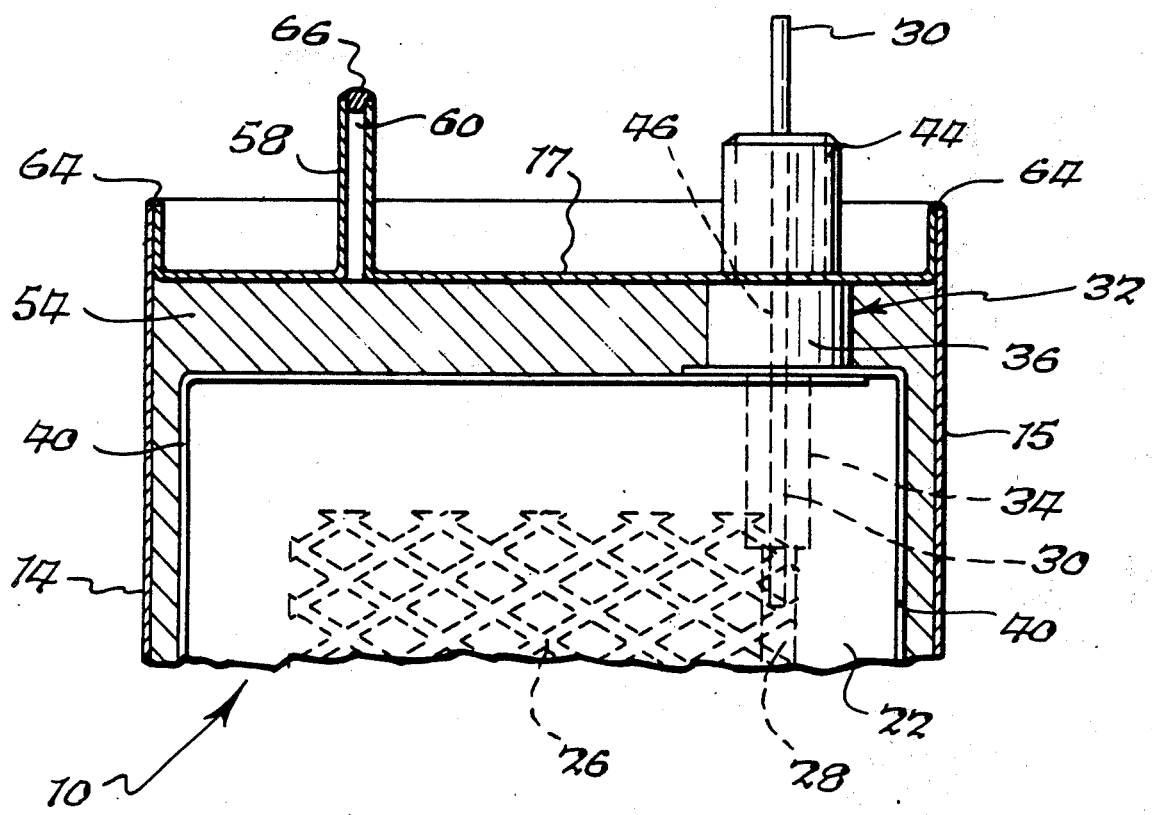
FIG. 3 is a fragmentary vertical sectional view with parts shown in elevation of the cell of FIG. 1.

Referring now to FIGS. 2 and 3, the cell of the present invention further includes anode means comprising a pair of lithium metal elements or plates 22, 24 having an anode current collector element 26 sandwiched or positioned therebetween. As shown in detail in FIG. 3, current collector 26 is relatively thin, preferably a sheet of no. 12 mesh zirconium metal. A conductor strip 28 of nickel or suitable metal is spot welded to collector element 26 along one edge thereof, and an electrical conductor 30 which can be of nickel, or other suitable metal is welded at one end to the strip 28 and is of sufficient length allowing it to extend out from the casing for making external electrical connection thereto. Conductor 30 is sealed from the remainder of the cell by means including an insulator element generally designated 32 which surrounds lead 30 and has a first portion 34 which is sandwiched between the anode plates 22, 24 and a second or body portion 36 which is cylindrical and located between the anode plates and lid 17 when the cell is completed. The insulator 32 is of a material which in addition to being a non-conductor of electricity also is non-reactive with bromine. One form of material found to perform satisfactorily is a fluoropolymer material commercially available under the name Halar, a trademark of the Allied Chemical Company. Of course, other materials having these characteristics can be used for the insulator 32.

The anode assembly comprising the lithium metal elements 22, 24 and current collector 26 is fitted within an anode holding means or frame in the form of a strap 40 which embraces the anode assembly in a manner exposing at least one metal surface. Strap 40 is of the aforementioned Halar material or any similar material which is non-reactive with bromine. In the present illustration, strap 40 surrounds the peripheral edges of the anode elements or plates 22, 24 in a snug, sealing relationship. The opposite ends of strap 40 are provided with apertures of a size sufficient to receive the insulator portion 34, and these ends are overlapped adjacent the insulator portion 34 as shown in FIG. 3. A ferrule 44 of metal such as stainless steel encloses a further portion of lead 30. Ferrule 44 is threaded at one end (not shown) and is connected into insulator portion 36, the inner surface of which also is threaded. Ferrule 44 is of generally hollow cylindrical shape, and the region between ferrule 44 and conductor 30 is filled by a glass seal 46 formed therein to provide a metal-glass hermetical seal.

One illustrative method of forming the anode assembly is as follows. First there is provided a subassembly including lead 30 within the combination of insulator 32 and ferrule 44. Strap 40 then is assembled into place with the ends overlapped to align the openings therein which then are fitted onto insulator portion 34. The overlapping ends joined to insulator portion 34 can be sealed in place with a suitable cement which is non-reactive with bromine such as a cyanoacrylate cement commercially available under the name Permabond 101. Similarly, the junction between insulator portion 36 and the bottom portion of ferrule 44 can be cemented. Current collector 26, conducting strip 28 and the end of lead 30 are spot welded together whereupon lithium plates 22, 24 are positioned within strap 40 on opposite sides of the collector element 26 and insulator portion 34. The subassembly then is placed within a suitable fixture or support and is pressed together with a suitable force, for example about 3,000 lbs. The current collector 26, strip 28, insulator portion 34 and the portion of lead 30 contained therein are sealed within the lithium elements 22, 24. The material of strap 40 is pressure bondable to lithium with the result that the peripheral juncture at the edges of the lithium elements 22, 24 is enclosed or sealed by the strap 40. If desired, the junction between the inner surface of strap 40 and the periphery of lithium elements 22, 24 can be sealed further by the aforementioned cement. The completed anode assembly thus has two exposed surfaces which are oppositely directed or disposed.

When the anode assembly is completed, the exposed surfaces of the lithium metal elements 22 and 24 can be provided with coatings 48 and 50, respectively, of an organic electron donor component material, and the nature of the coatings 48, 50 and their role in the cell of the present invention will be described in further detail presently. The completed anode assembly is positioned in casing 10 as shown in FIGS. 2 and 3, with the anode operative surfaces spaced from the inner surface of casing 10.

The cell of the present invention further comprises a cathode including a region of cathode material 54 within casing 10 and operatively contacting the exposed surfaces of the lithium elements 22, 24 and operatively contacting the inner surface of casing 10. Casing 10, being of electrically conducting material, serves as a cathode current collector. According to the present invention, the cathode material 54 comprises a charge transfer complex of a monomer and bromine. In particular, the cathode comprises pyridinium bromide per bromide. The cathode can comprise a mixture of solid pyridinium bromide per bromide and liquid bromine. Pyridinium bromide per bromide is readily commercially available from a number of sources, one of which is Matheson Coleman & Bell. The cathode of the cell of the present invention and manner of making the same will be described in further detail presently.

The cell of the present invention further comprises an element 58 on the casing and having a passage 60 therethrough which at one end thereof is in communication with the interior of casing 10 and which at the other end is externally exposed. In particular, element 58 is in the form of a metal tube fixed to lid member 17. Tube 58 preferably is a separate element which is fitted at one end into an aperture provided through lid 17 and welded thereto. Alternatively, the lid 17 and tube 58 could be formed integrally from a single piece of metal. Lid member 17 is fitted into place in the open end of the casing and is welded at 64 around the peripheral edge thereof to the corresponding edge of the casing. In making the cell of the present invention, when the cathode material is to include liquid bromine in addition to solid pyridinium bromide per bromide, the liquid bromine is introduced through passage 60 in the filling element 58 to the interior of the casing and into operative relationship with the solid pyridinium bromide per bromide and the lithium anode. Then passage 60 is closed by suitable means, for example an element 66 which can be a plug of material which is non-reactive with bromine and which is sealed in place by suitable non-reactive cement. Also, sealing passage 60 can of course be accomplished by pinching or clamping the outer end of tube 58 and sealing it further by welding. The metal tube 58 preferably of nickel also serves an an electrical terminal inasmuch as the casing 10 serves as a cathode current collector.

The lithium-bromine cell according to the present invention operates in the following manner. As soon as the bromine-containing cathode material 54 operatively contacts a lithium anode element, a solid lithium bromide electrolyte begins to form at the interface. In the cell illustrated in FIGS. 1-3, this occurs at the outer or oppositely disposed surfaces of the two anode elements 22 and 24. An electrical potential difference will exist between the anode lead 30 and the cathode terminal 58 because casing 10 is of electrically conductive material and operatively contacts the bromine-containing cathode material to serve as a cathode current collector. The mechanism by which the foregoing is accomplished is believed to include migration of lithium ions through the electrolyte whereby lithium is the ionic species in the cell.

Figure 4:
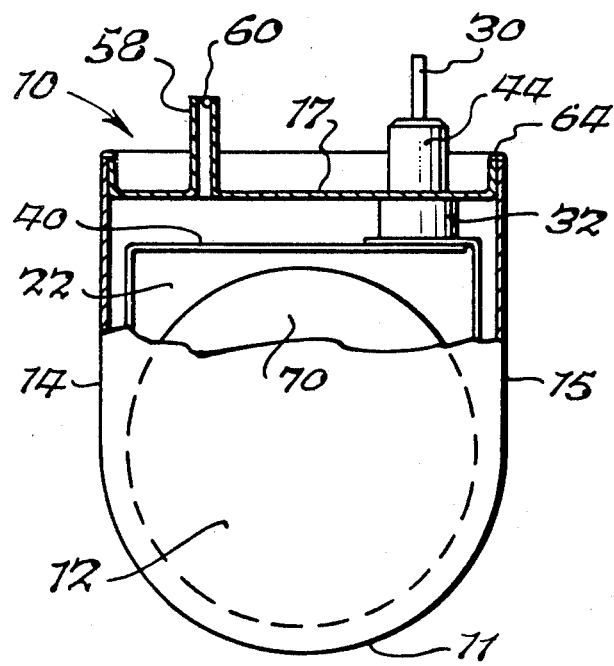
FIG. 4 is a side elevational view with parts removed illustrating a cell at one stage in the method of the present invention.
Figure 5:
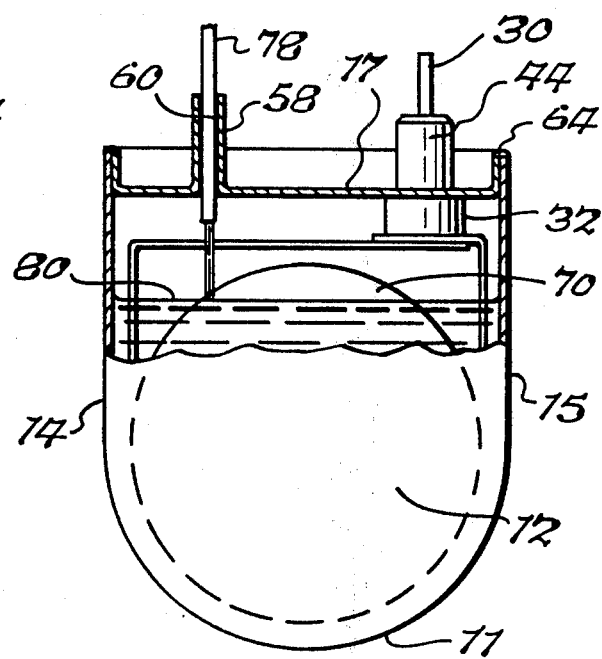
FIG. 5 is a side elevational view with parts removed illustrating a cell at another stage in the method of the present invention.

FIGS. 4 and 5 illustrate the method according to the present invention for making the lithium-bromine cell illustrated in FIGS. 1-3. As shown in FIG. 4 there is provided the casing 10, preferably of electrically conducting material such as stainless steel, and the lithium anode means in the casing including the pair of lithium plates, the one plate 22 being shown in FIG. 4, surrounded by the strap or frame 40 at the peripheral edges thereof and having the anode electrical conductor 30 extending therefrom and out through the casing being enclosed and insulated by the insulator element 32 and ferrule 44. The exposed or operative surfaces of the lithium plates can be coated with an organic electron donor material as previously described. According to a preferred mode of the present invention, the pyridinium bromide per bromide is in the form of a pellet or wafer, one of which is designated 70 in FIG. 4. It is preferred to include two such pellets or wafers in a cell, one adjacent each exposed face of the lithium anode.

After the solid pyridinium bromide per bromide material is placed in casing 10 in operative relationship with the lithium anode, the casing is sealed in a manner such that the filling element or tube 58 is fixed to the casing with one end of the passage 60 in communication with the interior of the casing and the other end externally exposed. As illustrated in FIG. 4, the filling element 58 is fixed to lid 17, which, in turn, is fitted into the open end of casing 10 with the aperture in the lid receiving ferrule 44 whereupon the lid is sealed to the casing by means of the weld 64.

The next step in the method of the present invention is introducing bromine through passage 60 in the filling element 58 to the interior of the casing into operative relationship with the pyridinium bromide per bromide pellets 70 and the lithium anode. In particular, a small diameter tube or conduit 78 leading from a supply of bromine (not shown) is placed in fluid communication with passage 60, and in the present illustration tube 78 is inserted into and along with element 58 so that the open end of the tube 78 is within the casing 10. Liquid bromine in a measured quantity or volume is conveyed from the supply through the tube 78 into the casing 10, the level of bromine at this illustrative stage of the method being designated 80 in FIG. 5. Tube 78 can have an outer diameter such that it fits relatively snugly within the passage 60 to prevent or minimize escape of bromine vapors from within casing 10 to the outside. If desired, the tube 78 can carry a suitable seal for engaging the end of filling element 58. One illustrative form of supply and dispenser is a hypodermic syringe where conduit 78 is the needle thereof. The amount of liquid bromine introduced to casing 10 generally will be sufficient to at least cover the pellets 70 and the exposed surfaces of the lithium plates, and often will be filled to a level above the anode assembly and below the lid 17. After the predetermined amount of bromine is introduced to casing 10, conduit 78 is removed from the filling element 58 and the passage 60 is closed as previously described, preferably pinching or otherwise mechanically forming the outer end into a flattened or clamped portion which then can be further sealed by welding.

In the cell according to the present invention, it is important that the bromine-containing cathode material is not allowed to come in contact directly with any portion of the electrical conducting means connected to the elements of the anode, in particular anode current collector 26 and leads 28, 30 shown in FIGS. 1–3. Otherwise, this will cause an electronic conduction between the cathode material and the anode current collector 26 or leads 28, 30 creating an electrical short circuit condition in the cell. In particular, any migration of the bromine-containing cathode material directly to anode current collector 26 or directly to leads 28, 30 instead of first reacting with an element of the anode, i.e. one of the lithium elements, will result in a condition of electronic conduction thereby creating a short circuit in the cell. On the other hand, when the bromine-containing cathode material contacts only the lithium metal portion of the anode this gives rise first to a condition of ionic conduction and results in proper cell operation.

In the cell of the present invention, all parts of the anode current collector 26 and leads 28, 30 are sealed from the cathode material and from the metal casing. Anode current collector 26 and its connection through strip 28 to lead 30 are sealed within the sandwiched or pressure bonded assembly of lithium plates 22, 24. This seal is enhanced by the strap 40 which is of Halar or similar material which is non-reactive with bromine.

The foregoing arrangement together with the provision of insulator 32 and ferrule 44 with glass seal 46 provides an anode structure which is completely sealed with the exception of the oppositely-directed operative lithium surface portions of the anode which are available to the cathode material. All parts of anode current collector 26 and leads 28, 30 are shielded from the cathode material and from the cell casing. Furthermore, the sealed anode assembly can be completed before the entire cell is assembled for efficiency in manufacturing. The foregoing advantages are provided in a cell which is relatively simple in construction.

The coatings 48 and 50 on lithium elements 22 and 24, respectively, perform several important functions, one of which is a desirable reduction in cell impedance believed to result from a better and improved electrically effective contact area between the cathode material and each lithium element. In addition, the coatings 48, 50 serve as protective coatings, permitting a relatively longer handling time during construction of the cell prior to introduction of the cathode material. The material of coatings 48, 50 is an organic electron donor material of the group of organic compounds known as charge transfer complex donors. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinyl-pyridine present in the range from about 10% to about 20% by weight with a strength of about 14% by weight of 2-vinyl-pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10% the resulting coating can be undesirably too thin and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing procedure can be repeated to provide multiple coatings or layers, for example three, on each lithium plate.

The lithium-bromine cell of the present invention is illustrated further by the following examples.

EXAMPLE I

A lithium element, uncoated, was placed in a transparent container and connected to one terminal of a volt-ohm meter. Pyridinium bromide per bromide powder was introduced to the container in contact with the lithium element. A molybdenum electrode connected to the other meter terminal was placed in contact with the quantity of powder in the container and used to press the powder into contact with the lithium element. This formed a cell with the lithium element serving as an anode and the molybdenum electrode serving as a cathode current collector. The observed open circuit voltage of the cell was 3.364 volts and the measured cell impedance was 12282 ohms. Then excess bromine in liquid form was added to the system, the container being closed in a suitable manner to minimize leakage of bromine vapor. Initially, the cell open circuit voltage was 3.200 volts and the cell impedance was 66 ohms. Then the voltage began to drop and then proceeded to rise, while the impedance rose very fast and much excess bromine was observed to be present. After forty minutes, the cell open circuit voltage was 3.55 volts and the cell impedance was 500 ohms. The cell was left on a voltage recorder overnight, and the next morning the open circuit voltage was 3.51 volts.

EXAMPLE II

A pyridinium bromide per bromide battery was constructed according to the procedure described in connection with FIGS. 1-5 hereinabove. Two pellets of pyridinium bromide per bromide were formed by pressing the commercial powder with sufficient force, for example about 6 tons, to pelletize the powder. The two pellets were placed in the battery casing, one against each of the lithium anode elements. The lithium elements were uncoated. The lid then was welded in place whereupon approximately 4 ml. of liquid bromine was injected through the filling element to the interior of the casing in operative contact with the pyridinium bromide per bromide pellets. The filling element then was pinched closed and welded to seal the interior of the casing. Voltage and impedance measurements were made by connecting a suitable meter between the anode terminal lead and the filling element which serves as the cathode terminal. The initial readings were an open circuit voltage of 3.225 volts and battery impedance of 10 ohms. After one hour, the readings were an open circuit voltage of 3.281 volts and battery impedance of 27 ohms. Very little change in battery voltage was observed when a 100 kilohm resistor was connected across the battery terminals. The measured battery voltage was 3.280 volts. The battery was left on open circuit overnight, and the next morning the open circuit voltage was observed to be 3.39 volts and the impedance was 27 ohms. There was no apparent self discharge.

EXAMPLE III

Two pyridinium bromide per bromide batteries were constructed according to the procedure described in Example II. During construction of the batteries, weight measurements were made of the casing, lid, lithium anode elements, pyridinium bromide per bromide pellets and injected liquid bromine. The results are summarized in the following table.

Table I

| Battery | Casing weight in grams | Lid weight in grams | Anode weight in grams | Pellet weight in grams | Liquid bromine weight in grams | Open circuit in volts | Impedance in ohms |
|---|---|---|---|---|---|---|---|
| A | 8.137 | 1.839 | 2.712 | 2.0 | 11.735 | 3.292 | 8.0 |
| B | 8.145 | 1.828 | 2.748 | 2.0 | 13.891 | 3.340 | 9.0 |

EXAMPE IV

A load test was performed on one of the batteries constructed according to Example III. A constant current circuit was used to apply known currents through the cell and the loaded voltages were measured at room temperature. The results are summarized in the following table.

Table II

| Known current in milliamperes | Measured voltage in volts | Load resistance in ohms |
|---|---|---|
| 0.66 | 3.350 | 5075 |
| 0.75 | 3.344 | 4459 |
| 1.00 | 3.318 | 3318 |
| 1.25 | 3.275 | 2620 |
| 1.50 | 3.238 | 2159 |
| 1.75 | 3.210 | 1834 |
| 2.00 | 3.188 | 1594 |

The foregoing illustrates the ability of the lithium bromine cell of the present invention to sustain voltage under high load conditions.

EXAMPLE V

Ten batteries were constructed according to the procedure described in Example II. In each battery the weight of the lithium anode was 1.10 grams, and different weights of pyridine bromide per bromide (PBr) and liquid bromine were employed. Open circuit voltage and cell impedance measurements were made both at room temperature and at 37° F. The results are summarized in the following table.

Table III

| Battery number | Liquid bromine weight in grams | P Br weight in grams | Impedance in ohms[1] | Open circuit voltage in volts[1] | Impedance in ohms[2] | Open circuit voltage in volts[2] |
|---|---|---|---|---|---|---|
| 1 | 16.03 | 0.223 | 29 | 0.333 | 211 | 3.49 |
| 2 | 15.95 | 0.221 | 209 | 3.470 | 234 | 3.48 |
| 3 | 15.51 | 0.481 | 54 | 3.472 | 46 | 3.48 |
| 4 | 16.31 | 0.494 | 42 | 3.452 | 42 | 3.47 |
| 5 | 14.87 | 0.976 | 51 | 3.450 | 39 | 3.48 |
| 6 | 15.37 | 0.969 | 44 | 3.467 | 33 | 3.49 |
| 7 | 13.93 | 1.461 | 113 | 3.348 | 63 | 3.49 |
| 8 | 13.85 | 1.497 | 78 | 3.465 | 50 | 3.49 |
| 9 | 13.47 | 1.950 | 81 | 3.473 | 50 | 3.48 |
| 10 | 14.01 | 1.981 | 84 | 3.460 | 53 | 3.48 |

[1] Room temperature conditions.
[2] Temperature condition at 37° F.

Battery nos. 1 and 7, while exhibiting unusual behavior initially at room temperature, were observed to level out in terms of voltage and/or impedance upon stabilization at 37° C. for about 24 hours.

It is therefore apparent that the present invention accomplishes its intended objects. The lithium bromine cell of the present invention having a cathode including pyridinium bromide per bromide has increased energy density, is capable of delivering relatively higher current, and is capable of operating under relatively low temperature conditions. The increased energy density is believed to result from the absence of chemical reactions within the battery which might otherwise tie up some of the bromine and prevent reaction with the lithium of the anode. The relatively higher mobility of the ions and electrons associated with the pyridinium bromide per bromide give the cell of the present low temperature compatibility.

While several embodiments of the present invention have been described in detail, this is for the purpose of illustration, not limitation.

We claim:

1. A lithium-bromine cell comprising a lithium anode, a solid electrolyte comprising lithium bromide and a bromine cathode comprising pyridine bromide per bromide.

2. A cell according to claim 1, wherein said cathode comprises a mixture of solid pyridinium bromide per bromide and liquid bromine.

3. A cell according to claim 1, wherein said lithium anode has a surface operatively contacting said cathode and wherein said cell further includes a coating on said lithium surface of an organic electron donor component material.

4. A cell according to claim 1, wherein said organic donor component comprises polyvinyl pyridine polymer.

5. A cell according to claim 1, wherein said anode comprises a lithium element having an exposed surface portion and another surface portion and said cell further including a casing of electrically conducting material containing said anode, electrical conductor means operatively connected to said other surface portion of said lithium element and extending from said casing, and means for sealing said conductor means from the remainder of said cell, said bromine cathode being within said casing and in operative contact with said exposed surface of said lithium element and with said casing in a manner such that said casing serves as a cathode current collector.

6. A cell according to claim 5 further including terminal means on said casing and comprising a hollow element of electrically conducting material having an internal passage in communication with the interior of said casing and means closing said passage whereby prior to closing said passage said element functions to allow introduction of bromine to the interior of said casing into operative relationship with said lithium anode element and after closing said passage said element functions as an electrical terminal and an electrical potential difference exists between said terminal and said conductor means during operation of said cell.

* * * * *